(12) United States Patent
Plummer et al.

(10) Patent No.: US 11,760,040 B2
(45) Date of Patent: Sep. 19, 2023

(54) TOOL AND METHOD FOR FORMING CONTOURED COMPOSITE STRINGERS HAVING REDUCED WRINKLING

(71) Applicant: The Boeing Company, Chicago, IL (US)

(72) Inventors: Steven Joseph Plummer, Seattle, WA (US); Kurtis Shuldberg Willden, Kent, WA (US); Andrew Elmer Modin, Charleston, SC (US); Paul Chace Wilcoxson, Kent, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/447,591

(22) Filed: Sep. 14, 2021

(65) Prior Publication Data

US 2022/0080680 A1 Mar. 17, 2022

Related U.S. Application Data

(60) Provisional application No. 63/079,787, filed on Sep. 17, 2020.

(51) Int. Cl.
*B29C 70/46* (2006.01)
*B29C 70/44* (2006.01)
*B29D 99/00* (2010.01)
*B64C 1/06* (2006.01)
*B64C 1/00* (2006.01)

(52) U.S. Cl.
CPC .......... *B29C 70/462* (2013.01); *B29C 70/446* (2013.01); *B29D 99/0003* (2013.01); *B64C 1/064* (2013.01); *B64C 2001/0072* (2013.01)

(58) Field of Classification Search
None
See application file for complete search history.

(56) References Cited

U.S. PATENT DOCUMENTS

| | | | |
|---|---|---|---|
| 2,484,288 A * | 10/1949 | Hamm | F16J 9/063 428/595 |
| 4,548,859 A | 10/1985 | Kline et al. | |
| 5,378,134 A | 1/1995 | Blot et al. | |
| 8,465,613 B2 | 6/2013 | Rotter et al. | |
| 8,557,165 B2 * | 10/2013 | Jones | B29C 33/308 264/320 |
| 8,997,642 B2 | 4/2015 | Stewart et al. | |

(Continued)

FOREIGN PATENT DOCUMENTS

| EP | 1393875 A1 | 3/2004 |
|---|---|---|
| EP | 3115185 A1 | 1/2017 |

(Continued)

OTHER PUBLICATIONS

European Patent Office Extended Search Report, dated Dec. 1, 2021, regarding EP Application No. 21180643.5, 8 pages.

(Continued)

*Primary Examiner* — Barbara J Musser
(74) *Attorney, Agent, or Firm* — Yee & Associates, P.C.

(57) ABSTRACT

A tool for making contoured composite hat stringers allows control of stringer wrinkling. The tool includes a set of first openings that allow the tool to flex during contouring of the stringer, and a set of second openings into which portions of the composite charge may strain during the contouring.

25 Claims, 15 Drawing Sheets

(56) References Cited

U.S. PATENT DOCUMENTS

| | | |
|---|---|---|
| 9,162,396 B2 | 10/2015 | Coxon et al. |
| 9,272,767 B2 | 3/2016 | Stewart |
| 9,387,628 B2 | 7/2016 | Chapman et al. |
| 9,782,960 B1 | 10/2017 | Roins et al. |
| 10,315,750 B2 | 6/2019 | Stewart |
| 10,369,740 B2 | 8/2019 | Chapman et al. |
| 10,399,283 B2 | 9/2019 | Offensend et al. |
| 10,456,960 B2 | 10/2019 | Chapman et al. |
| 2010/0102482 A1 | 4/2010 | Jones et al. |
| 2011/0127698 A1 | 6/2011 | Alenby et al. |
| 2013/0340928 A1 | 12/2013 | Rotter et al. |
| 2014/0103585 A1 | 4/2014 | Coxon et al. |
| 2014/0314996 A1 | 10/2014 | Stewart |
| 2016/0023409 A1 | 1/2016 | Coxon et al. |
| 2016/0339682 A1 | 11/2016 | Bahe et al. |
| 2017/0021534 A1 | 1/2017 | Chapman et al. |
| 2017/0057100 A1 | 3/2017 | Shaw et al. |
| 2017/0095986 A1* | 4/2017 | Feigenblum ............ B29C 33/06 |
| 2019/0291306 A1 | 9/2019 | Hannan et al. |
| 2020/0231267 A1 | 7/2020 | Rotter et al. |
| 2021/0107238 A1 | 4/2021 | Saini et al. |
| 2021/0107239 A1 | 4/2021 | Saini et al. |
| 2022/0080649 A1 | 3/2022 | Plummer et al. |
| 2022/0080683 A1 | 3/2022 | Plummer et al. |

FOREIGN PATENT DOCUMENTS

| | | |
|---|---|---|
| EP | 3162544 A1 | 5/2017 |
| EP | 3628472 A1 | 4/2020 |
| EP | 3677397 A1 | 7/2020 |
| EP | 3693155 A1 | 8/2020 |
| EP | 3708347 A1 | 9/2020 |

OTHER PUBLICATIONS

European Patent Office Extended Search Report, dated Dec. 17, 2021, regarding EP Application No. 21183660.6, 8 pages.

Final Office Action, dated Feb. 21, 2023, regarding U.S. Appl. No. 17/447,593, 9 pages.

European Patent Office Extended Search Report, dated Feb. 11, 2022, regarding EP Application No. 21192330.5, 6 pages.

Office Action, dated Nov. 29, 2022, regarding U.S. Appl. No. 17/447,593, 28 pages.

Office Action, dated Apr. 19, 2023, regarding U.S. Appl. No. 17/447,595, 45 pages.

EPO. "European Search Report for EP 3970955 A1". EPO. Espacenet. 2023 (Year: 2023).

* cited by examiner

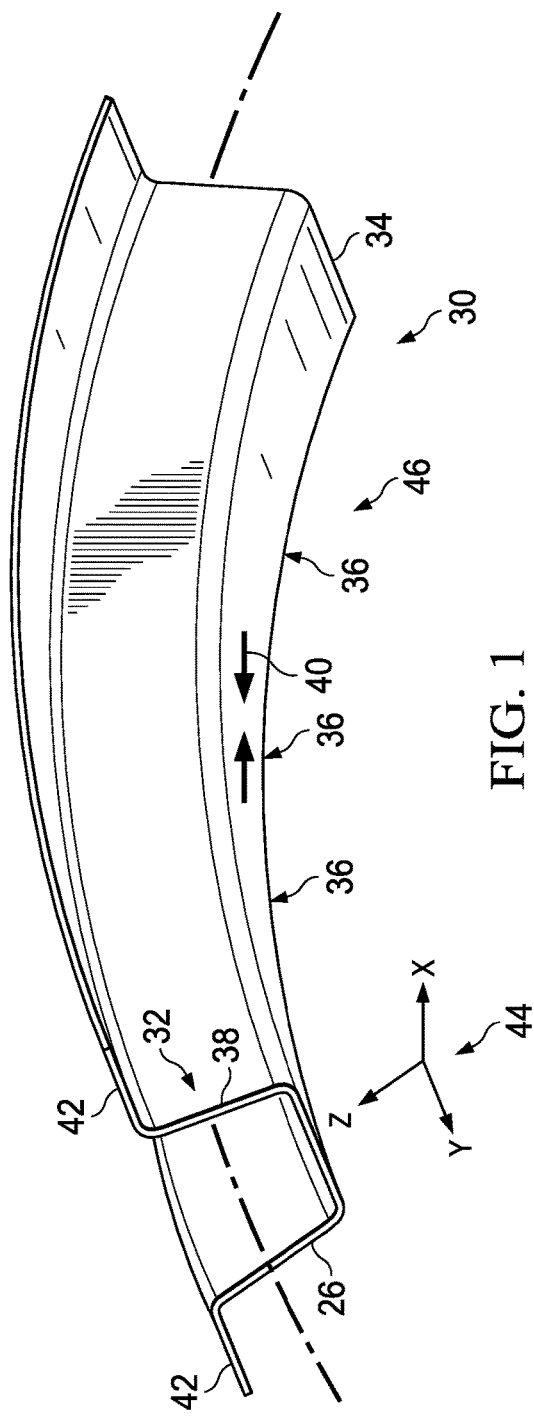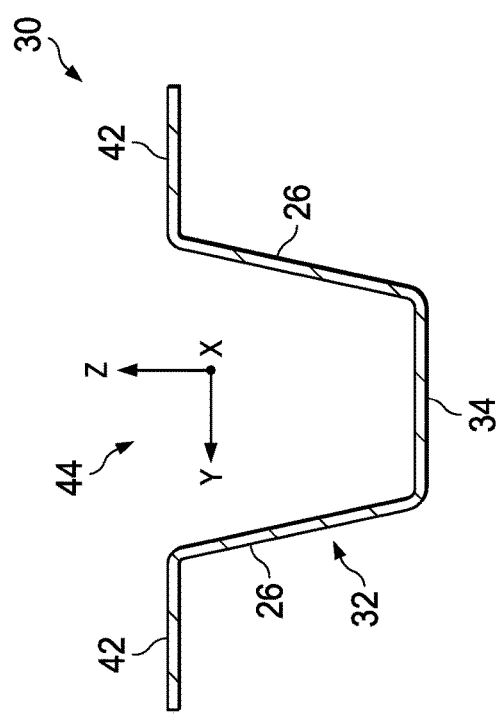

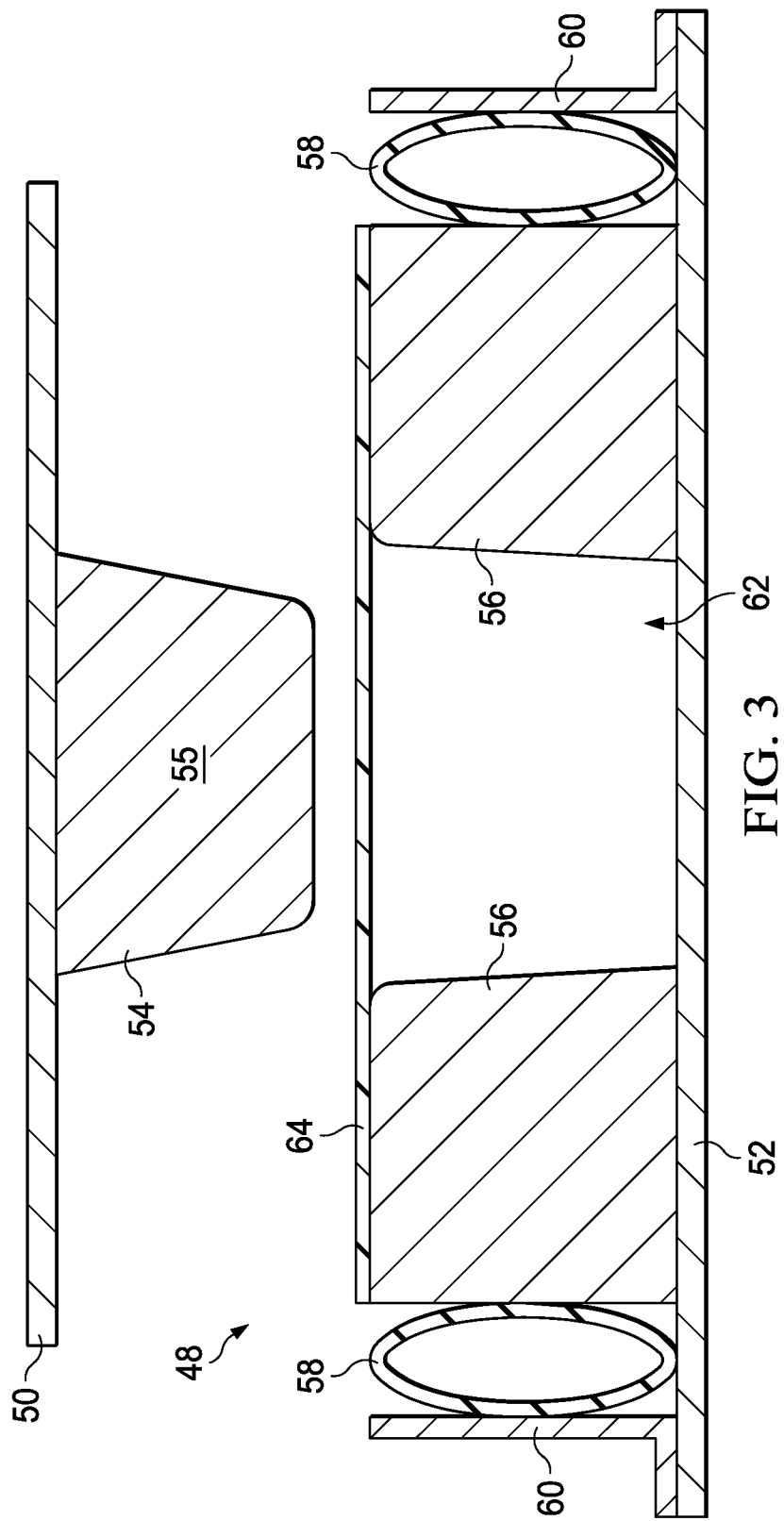

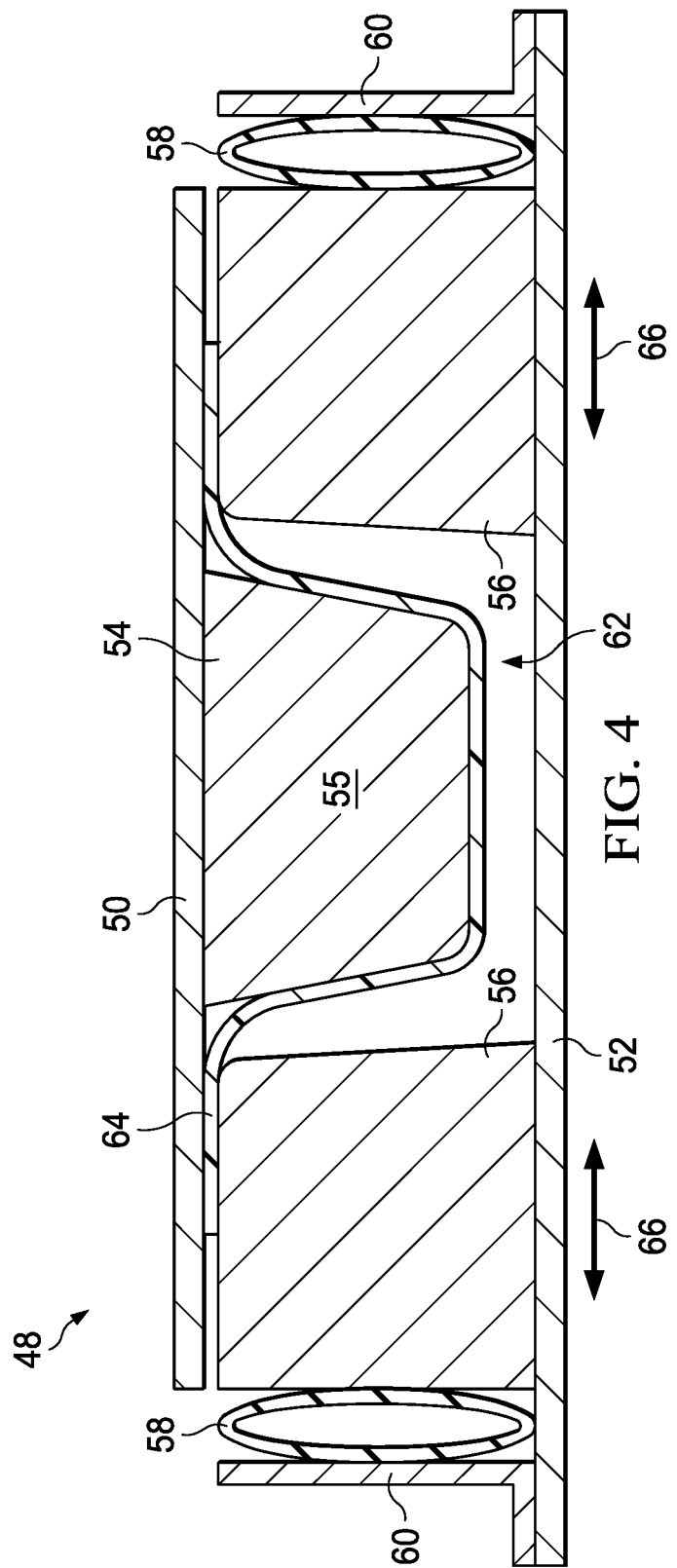

TOOL AND METHOD FOR FORMING CONTOURED COMPOSITE STRINGERS HAVING REDUCED WRINKLING

RELATED PROVISIONAL APPLICATION

This application claims the benefit of U.S. Provisional Patent Application Ser. No. 63/079,787, filed Sep. 17, 2020, and entitled "Tool and Method for Forming Contoured Composite Stringers Having Reduced Wrinkling;" which is incorporated herein by reference in its entirety.

BACKGROUND INFORMATION

1. Field

The present disclosure generally relates to production of contoured composite stringers, and deals more particularly with a tool and method producing such stringers having reduced wrinkling.

2. Background

One technique for producing composite stringers involves using a punch having the shape of the stringer to form a flat composite charge into a die. Some composite stringers have one or more contoured sections along their length. In order to produce these contoured sections, the stringer is formed to the desired contour in a secondary forming operation. The stringer contouring operation results in a concentration of stresses along the inside radius of the stringer within the contoured sections. These stress concentrations can cause the formation of wrinkles in the stringer which are large enough to affect stringer performance. In some cases, the stringer may be reworked to reduce the wrinkles to acceptable levels, while in other cases it may be necessary to discard the stringer. Stringer rework increases labor costs, while discarding stringers due to excessive wrinkles increases material costs.

It would therefore be desirable to provide a tool and a method for producing contoured composite stringers that reduces wrinkling levels that are acceptable.

SUMMARY

The disclosure relates in general to methods and equipment for producing composite stringers, and more specifically to a tool and method for producing contoured composite stringers having reduced wrinkling.

According to one aspect, a tool is provided for forming a composite charge into a contoured composite stringer. The tool includes a tool body that is flexible and has a length. The tool body includes a set of transversely extending first openings therein that are configured to allow the tool body to flex during forming of a composite charge. The tool body further includes a set of transversely extending second openings therein into which portions of the composite charge may strain during the forming.

According to another aspect, a tool is provided for forming a composite charge into a contoured stringer having a desired cross-sectional shape. The tool includes a punch configured to form the composite charge into a formed stringer having the desired cross-sectional shape and to contour the form to stringer along a length of the formed stringer. The punch includes openings therein into which the composite charge may strain as the formed stringer is being contoured along its length.

According to a further aspect, a method is provided of making a contoured composite stringer having reduced wrinkling. The method includes forming a flat composite charge into a desired cross-sectional shape using a tool, and contouring the stringer including flexing the tool. The method also includes using a first set of openings in the tool to allow the tool to flex to a desired contour, and using a second set of openings in the tool to relieve stress in the composite charge during the forming by allowing portions of the composite charge to strain into the second set of openings.

One of the advantages of the disclosed embodiments is that contoured composite stiffeners such as contoured hat stiffeners can be produced that exhibit reduced wrinkling and/or smaller wrinkles that are of acceptable size. Another advantage is that wrinkling of composite hat stringers caused by contouring is diffused, thereby improving stringer performance. Another advantage is that rework of stringers due to inconsistencies may be reduced or eliminated thereby saving labor costs. A further advantage is that scrapping non-conforming stringers due to unacceptably large wrinkles may be reduced or eliminated.

The features, functions, and advantages can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and advantages thereof, will best be understood by reference to the following detailed description of an illustrative examples of the present disclosure when read in conjunction with the accompanying drawings, wherein:

FIG. 1 is an illustration of a perspective view of a contoured hat stringer.

FIG. 2 is an illustration showing the cross sectional shape of the hat stringer shown in FIG. 1.

FIG. 3 is an illustration of a cross-sectional view of a tool set used to form the hat stringer of FIG. 1.

FIG. 4 is an illustration similar to FIG. 3, but showing a punch having formed a composite charge into the cross-sectional shape shown in FIG. 2.

DETAILED DESCRIPTION

Figure 5:
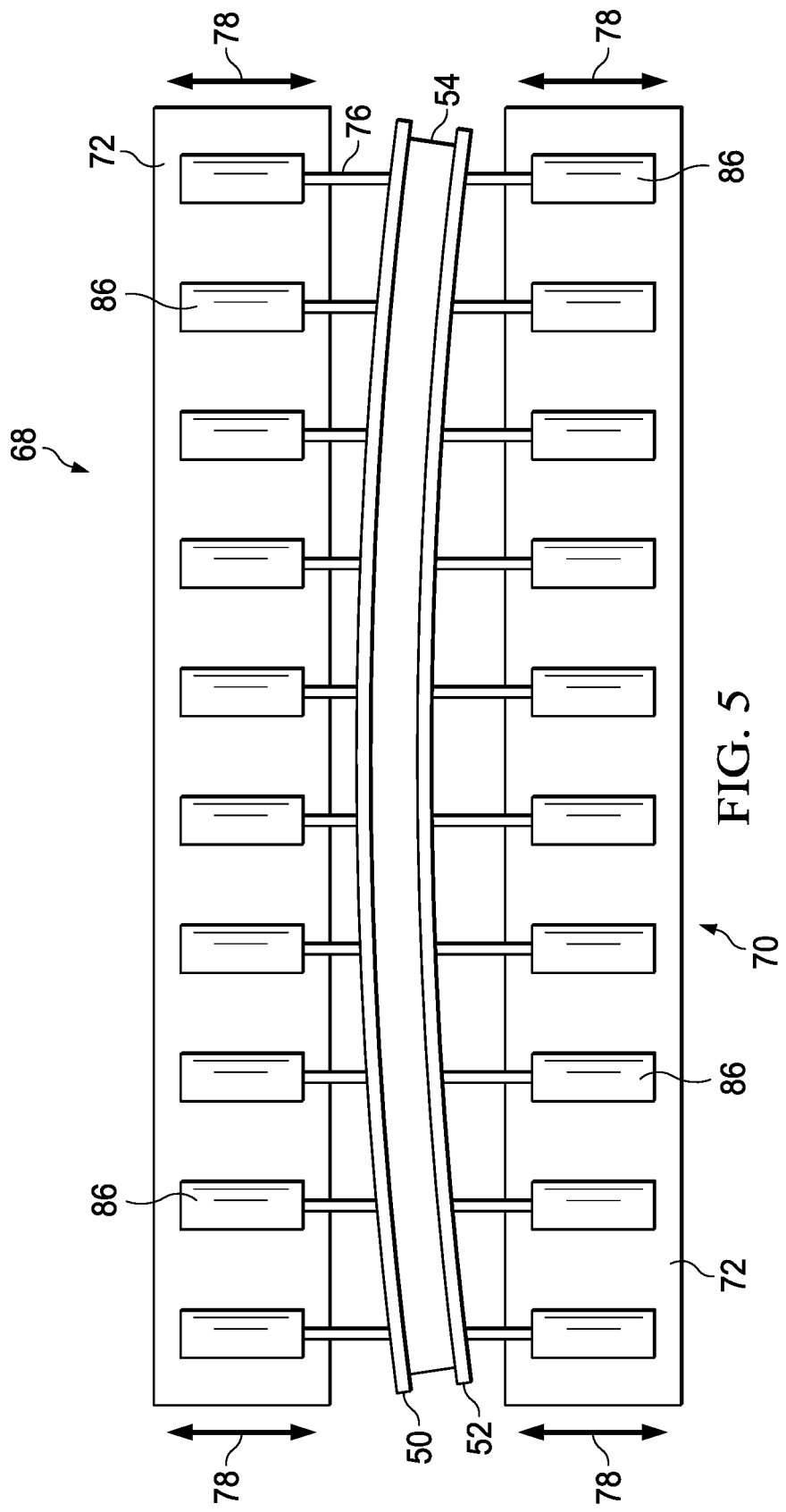
FIG. 5 is an illustration of a side view of a mechanism for changing the contour of the tool set shown in FIGS. 3 and 4.
Figure 6:
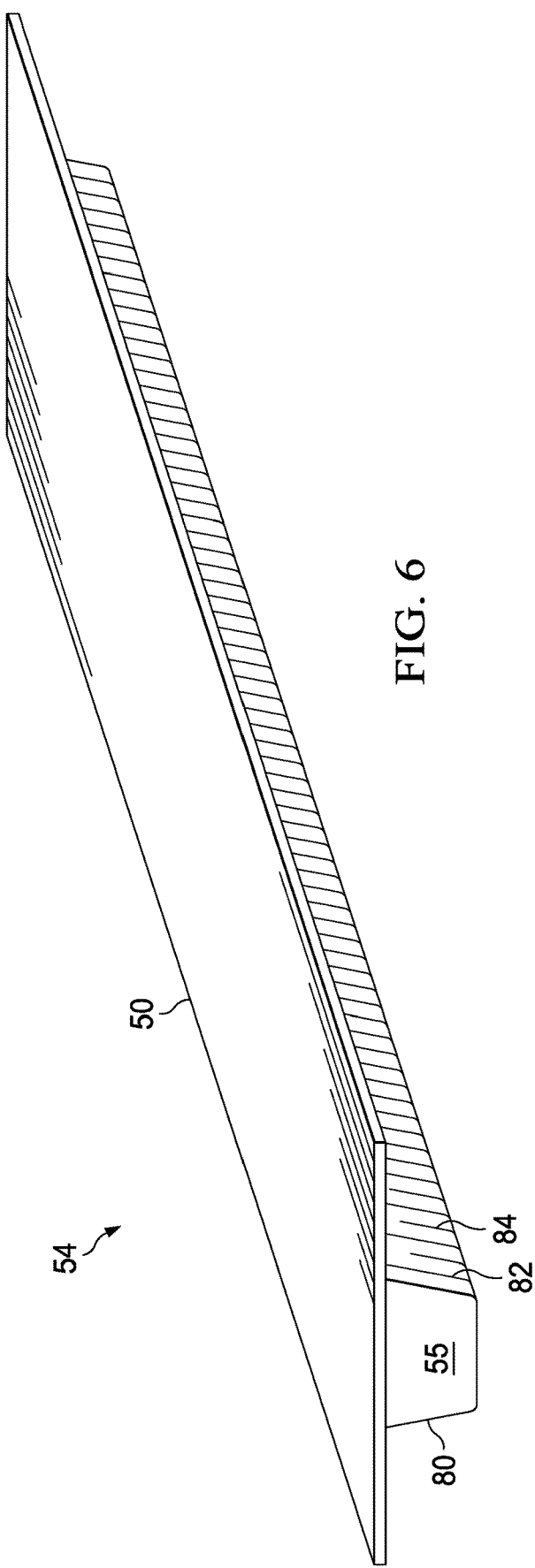
FIG. 6 is an illustration of a perspective view of a punch forming part of the tool set shown in FIGS. 3 and 4.
Figure 7:
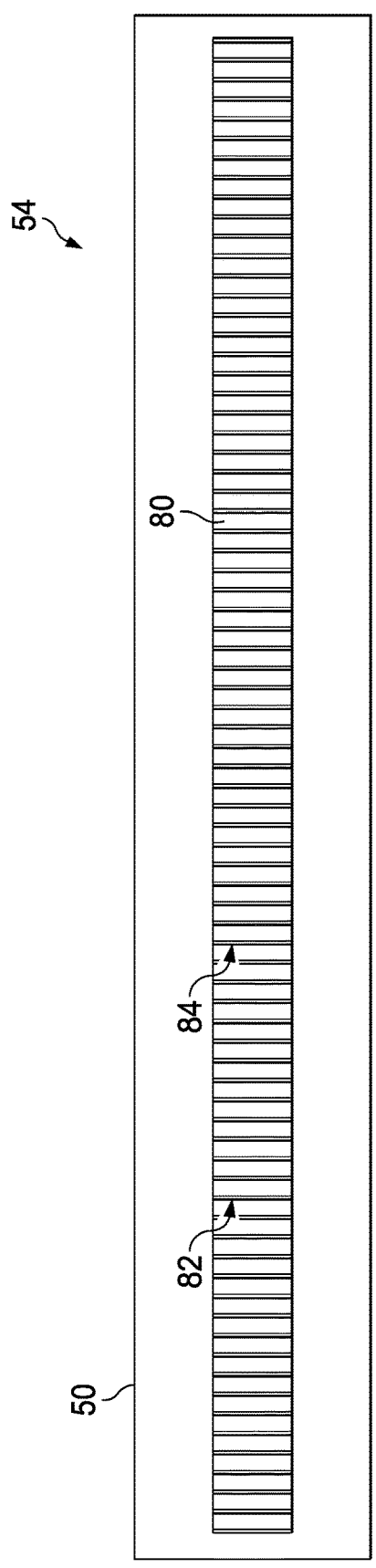
FIG. 7 is an illustration of a bottom plan view of the punch shown in FIG. 6.
Figure 8:
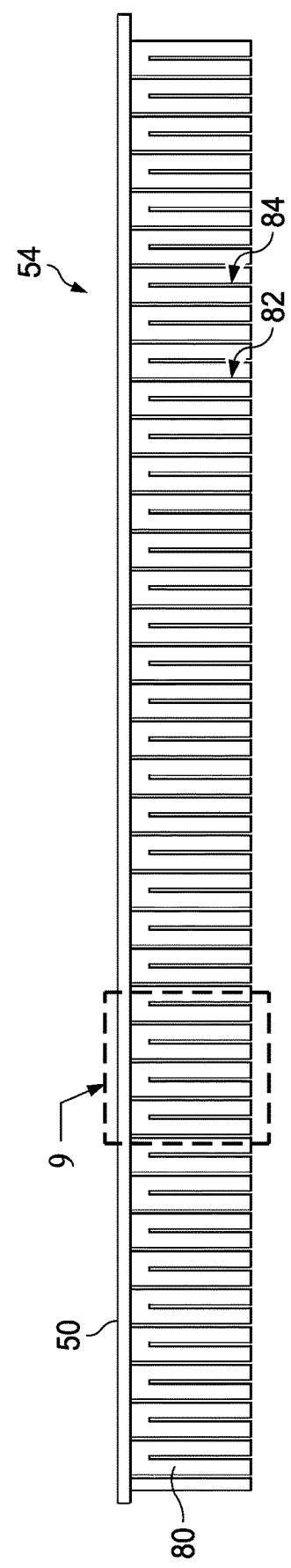
FIG. 8 is an illustration of a side view of the punch shown in FIGS. 6 and 7.
Figure 9:
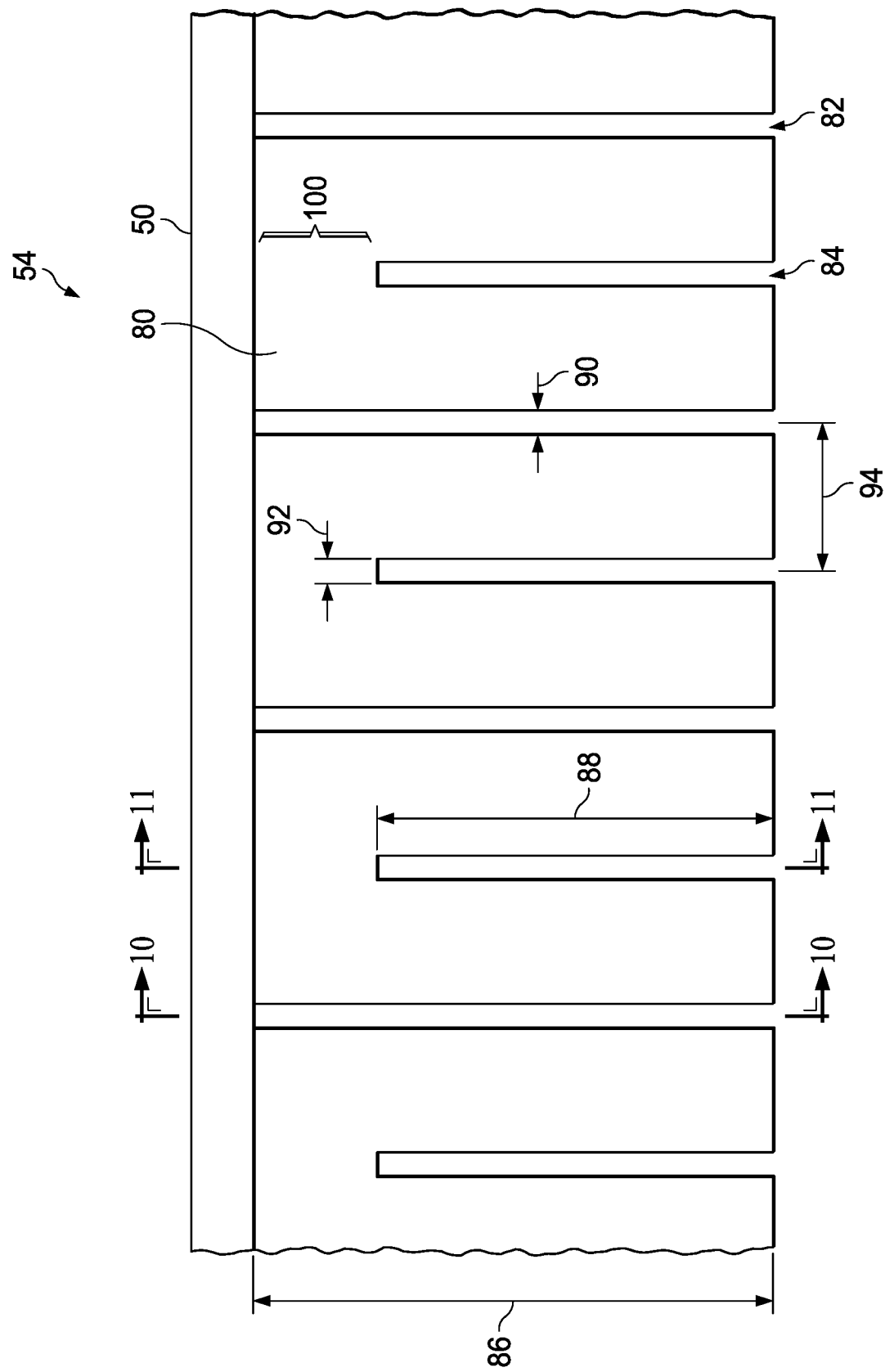
FIG. 9 is an illustration of the area designated as "9" in FIG. 8.
Figure 10:
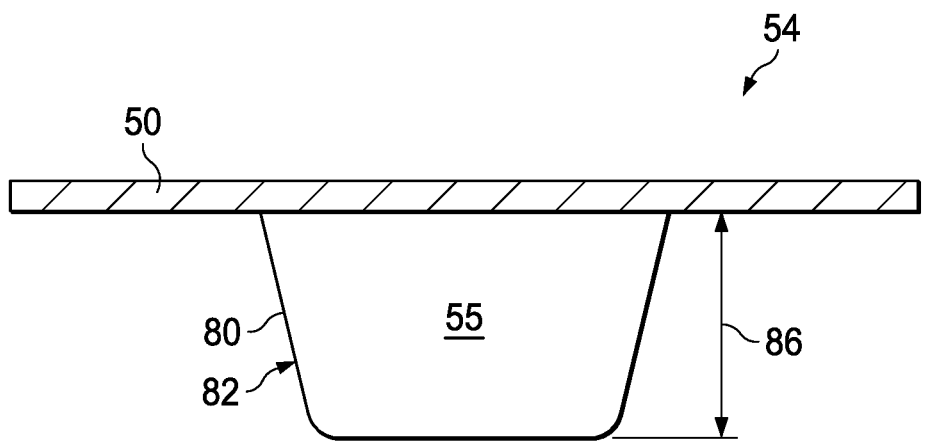
FIG. 10 is an illustration of a sectional view taken along the line 10-10 in FIG. 9.
Figure 11:
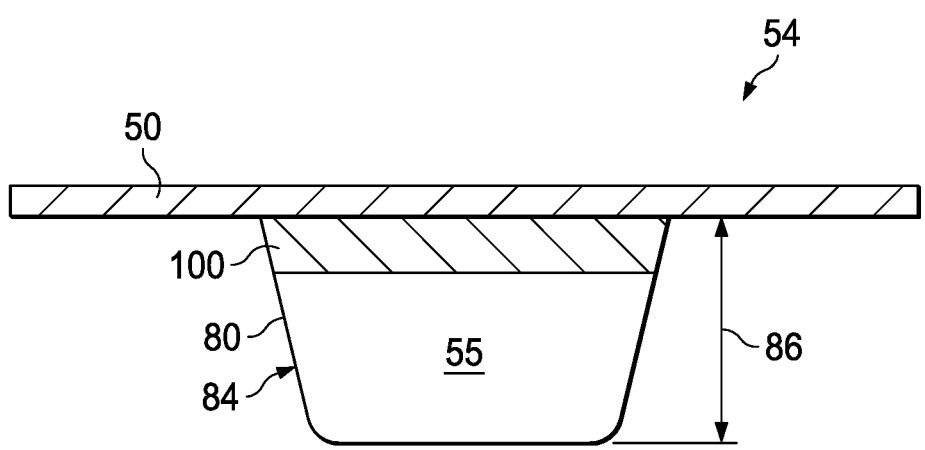
FIG. 11 is an illustration of a sectional view taken along the line 11-11 in FIG. 9.
Figure 12:
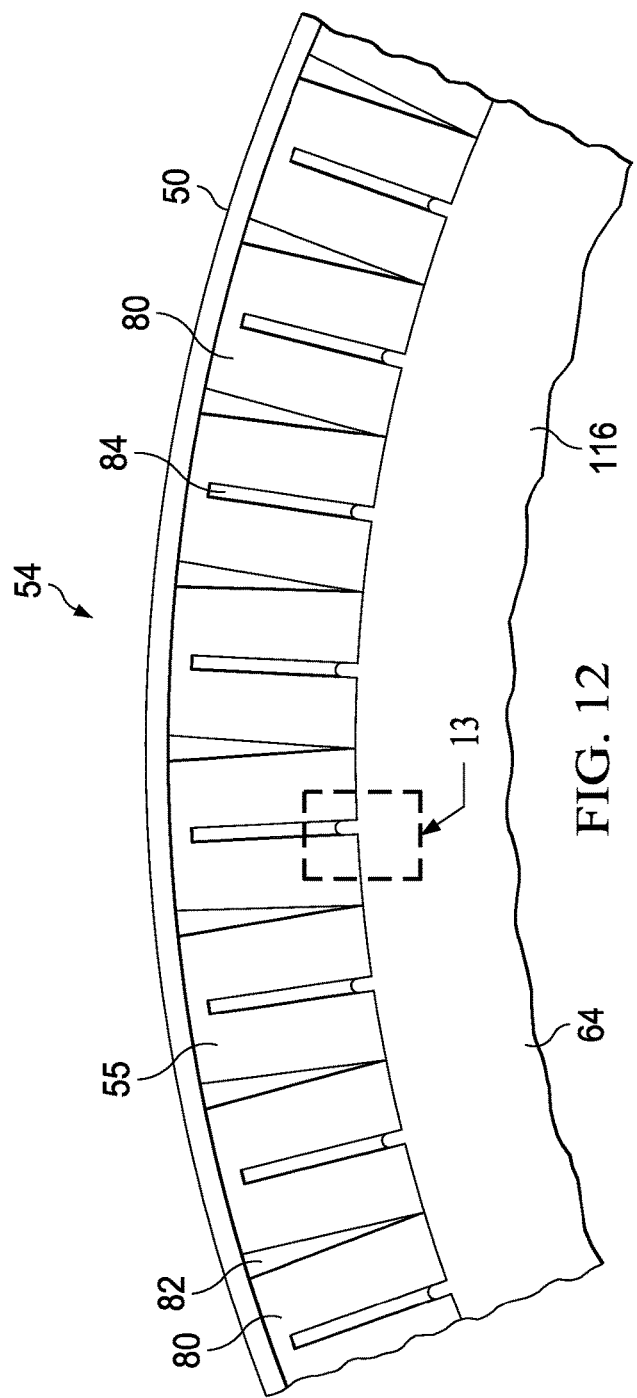
FIG. 12 is an illustration of a fragmentary side view of the hat stringer during contouring by the punch.
Figure 13:
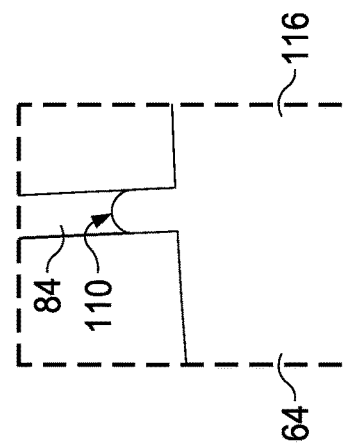
FIG. 13 is an illustration of the area designated as "13" in FIG. 12.
Figure 14:
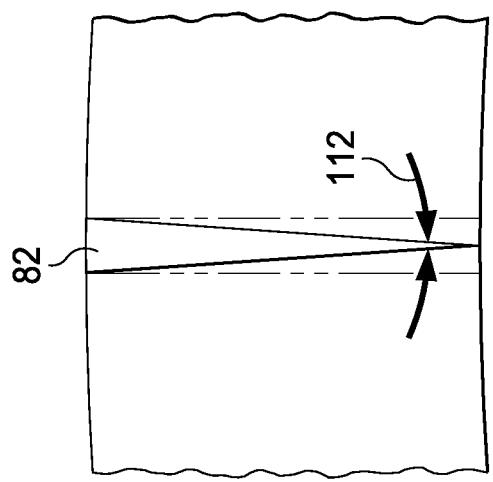
FIG. 14 is an illustration of a diagrammatic view showing how openings in the punch may close during a contouring of the hat stringer.
Figure 15:
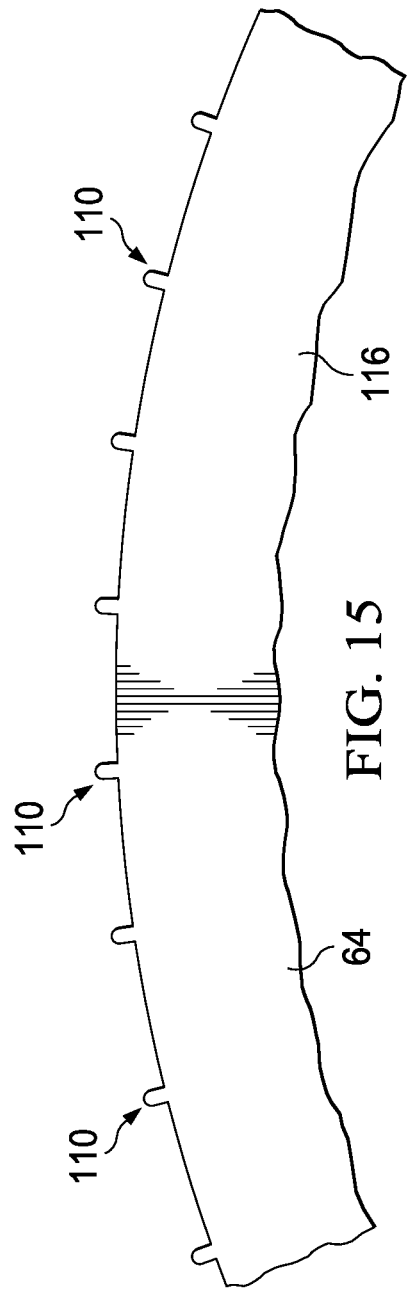
FIG. 15 is an illustration of a side view of the cap of a hat stringer that has been formed to contour, showing the formation of small wrinkles.

Referring first to FIGS. 1 and 2, a hat stringer 30 having one or more out-of-plane curvatures comprises a hat section 32 and a pair of outwardly turned flanges 42. The hat section 32 includes a substantially flat cap 34 coupled with the flanges 42 by a pair of inclined webs 38. The hat stringer 30 may possess other cross sectional shapes, such as a rounded cap shape (not shown).

The hat stringer 30 comprises a composite laminate formed of multiple plies of a fiber reinforced polymer such as a thermoset or thermoplastic. As will be discussed below, the hat stringer 30 may have one or more out-of-plane contours or curvatures along its length. In the example shown in FIG. 1, the hat stringer 30 possesses a single constant curvature in the X-Z plane within the coordinate system shown at 44. Referring particularly to FIG. 1, as will be discussed later, during forming of the hat stringer 30 to the desired cross-sectional shape, regions 36 of the cap 34 along inside radius of the hat section 32 may be placed in compression 40 as a result of the forming and contouring processes. In one example, contouring of the hat stringer 30 occurs as the hat stringer is being formed to the desired cross section shape. Alternatively, in another example, the hat stringer 30 may be contoured along its length in a separate operation after it has been formed to the desired cross sectional shape. In each of these examples, due to the contouring, the cap 34 is placed in compression 40 along the regions 36 of its length that are contoured. Compression 40 of the cap 24 in this manner during stringer contouring may result in the formation of unacceptable large wrinkles in the cap 34, or in other areas of hat section 32.

FIGS. 3 and 4 illustrate a tool set 48 for forming a flat composite charge 64 into a contoured hat stringer 30 exhibiting reduced wrinkling. The toolset 48 comprises a tool 54, which in this example is a punch 55, and a pair of dies 56 that are spaced apart to form a die cavity 62. The punch 55 is formed of a flexible material, such as an elastomer, nylon or PTFE (polytetrafluoroethylene) to name only a few, allowing it to flex as required. In the illustrated example, the punch 55 is mounted on the bottom of a flexible top plate 50 which may comprise, for example and without limitation, sheet aluminum. In other examples, however, the top plate 50 may also be an elastomer or other polymer that is integrally formed with the punch 55. The cross sectional shape of the punch 55 substantially matches the IML (inner mold line) of the hat section 32 (FIG. 2). The tool set 48 may be installed in a press 70 (FIG. 5) having press plates 72 which move the top and bottom plates 50, 52 relative to each other, causing displacement of the punch 55 into the die cavity 62 at a desired rate and with a desired amount of force.

The dies 56 are mounted for lateral movement 66 on a flexible bottom plate 52. In one example, the dies 56 comprise a series of interconnected die blocks that permit the dies 56 to flex out-of-plane. A pair of side rails 60 is secured to the bottom plate 52, outboard of the dies 56. Inflatable side bladders 58 are respectively located between the dies 56 and the side rails 60. The side bladders 58 may be inflated with a fluid such as air, and function to control the outward lateral movement of the dies 56 during the forming process.

A stringer forming operation begins with the tool set 48 arranged as shown in FIG. 3, with the punch 55 in a raised position. A flat composite charge 64 is placed on the dies 56, spanning the die cavity 62. To form the flat composite charge 64 into a desired cross sectional shape of the hat stringer 30, the top plate 50 moves down, causing the punch 55 begin forming the composite charge 64 into the die cavity 62.

In one example, as previously mentioned, before forming the composite charge to the desired cross-section shape, the tool set 48 is contoured along its length using, for example, a contour changing mechanism 68 (FIG. 5). Consequently, in this example of the forming sequence, the composite charge 64 is formed into the die cavity 62 that has been already contoured along its length, consequently, compression of contoured regions 36 of the cap 34 occurs as the cross-sectional shape of the hat section 32 is being formed.

In another example of the forming sequence, the composite charge 64 is formed into the die cavity 62 before the tool set 48 is contoured along its length. In this case, compression of the contoured regions 36 of the cap 34 occurs after the cross-sectional shape of the hat section has been formed, as the hat section 32 is being contoured along its length. Regardless of which of these forming sequences is used, the contour forming process results in compression 40 (FIG. 1) of the cap 34. This compression produces stresses in the cap 34, which may result in the generation of wrinkles that are unacceptably large.

Attention is now directed to FIGS. 6-11, which illustrate a tool 54 for forming the hat stringer 30 with reduced large-scale wrinkling. In this example, the tool 54 comprises a tool body 80 in the form of a punch 55 having an outer shape matching that of the hat section 32 of the hat stringer 30. As previously discussed, the punch 55 is formed of a material that is flexible yet sufficiently rigid to form the composite charge to the desired stringer shape. In one example, the punch 55 may be attached to the top plate 50 by any suitable means. In another example, the top plate 50 and the punch 55 are of a one piece construction, integrally formed of the same material.

The tool body 80 is provided with a plurality of first openings 82 and a plurality of second openings 84. Each of the openings 82, 84 may comprise a slit or slot in the tool body 80. In the illustrated example, the first and second openings 82, 84 are regularly spaced apart from each other a desired distance 94 (FIG. 9) and arranged in alternating relationship to each other. In other examples discussed below, the openings 82, 84 may be irregularly spaced apart from each other and may be arranged in other orders. The width 90 of the first openings 82 as well as the width 92 of the second openings 84 will depend upon the application. In the illustrated example, the first openings extend across the punch 55 and up through its entire height 86 and provide the punch 55 with flexibility. The second openings 84 extend partially across the punch 55 but have a height 88 less than the height 86 (FIG. 11) of the punch 55, resulting in a solid section 100 in the punch 55 immediately above each of the second openings 84.

Referring now to FIGS. 12-15, as the punch 55 forms the composite charge 64 to the desired contour, the first openings 82 partially or fully close, allowing the punch 55 to flex to the desired contour. However, the second set of openings 82 remain open during this flexing because the solid section 100 above the second openings 84 prevent them from closing. Consequently, because the second set of openings 84 remain opening during the contouring, portions of the composite charge 64 may strain into the second set of openings 84 and form a series of small wrinkles 110, the size of which are acceptable because due to their small size, the wrinkles 110 do not, either individually or collectively, materially affect the performance of the hat stringer 32. The stresses in the composite charge 64 resulting from the contouring process are redirected to the IML (inner mold line) of the hat stringer 30 where they are relieved as a result of the composite charge 64 straining into the second set of openings 84 and forming small wrinkles 110 of acceptable size. In effect, the strain in the composite charge 64 along the inside radius of the hat stringer caused by the contouring process is diffused, resulting in a series of small wrinkles 110, rather than larger wrinkles.

Figure 16:
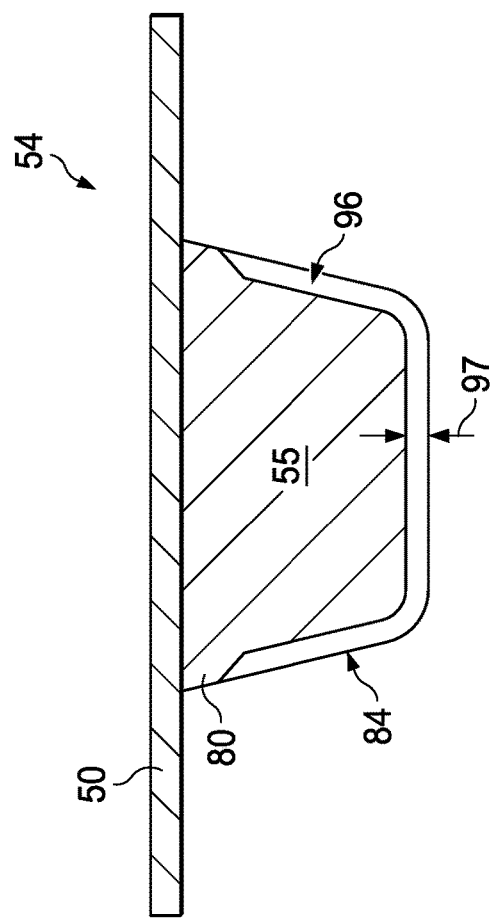
FIG. 16 is an illustration of a cross sectional view of another example of the punch.

FIG. 16 illustrates another example of the punch 55 in which the second set of openings 84 comprise grooves 96 formed in the surface of the tool body 80. The grooves 96 may extend partially or fully around the punch 55, and have a depth 97 that is sufficient to allow small wrinkles 110 to form in grooves 96 as the hat stringer 30 is being contoured.

Figure 17:
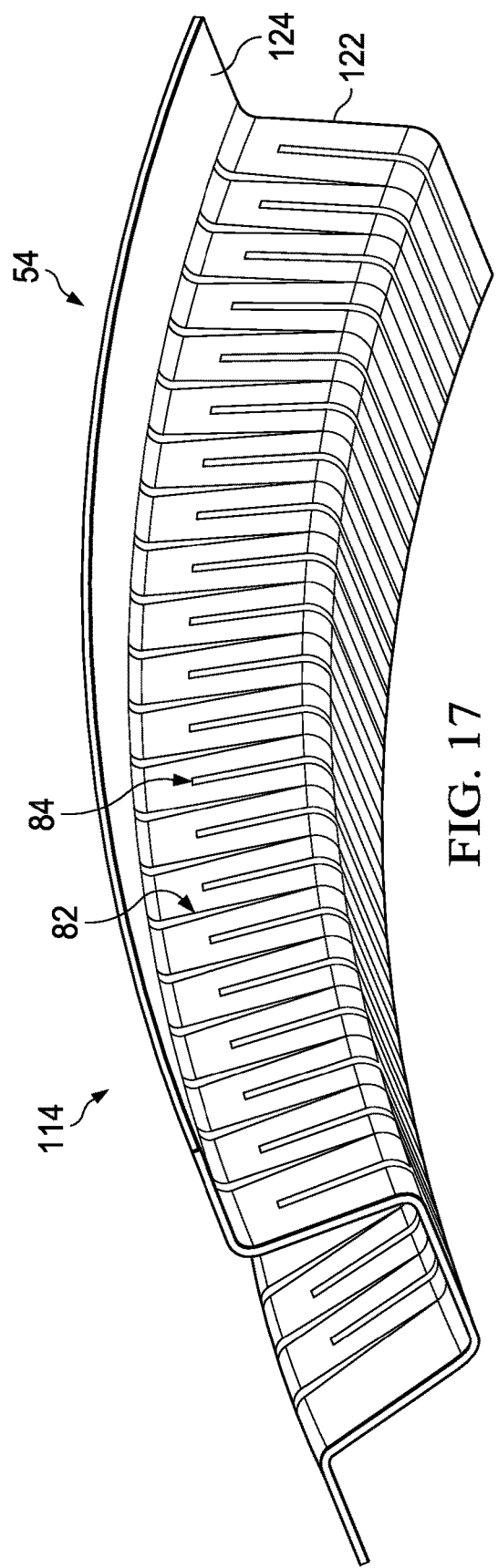
FIG. 17 is an illustration of a perspective view of a compactor.

Referring to FIG. 17, the tool 54 may comprise a compactor 114 which may be used to contour and then compact a straight stringer that has been formed to the desired cross-sectional shape. The illustrated compactor 114 is formed of a composite, however in other examples, it may be formed of a suitable polymer that is capable of flexing. The compactor 114 includes a hat shaped body 122 and outwardly extending flanges 124 which form a shape matching that of the hat stringer 30. The compactor 114 includes sets of first and second openings 82, 84 therein which may be in the form of slits or slots similar to those in the punch 55 previously described. The first and second openings 82, 84 are alternately arranged along the length of the hat shaped body 122. The first openings 82 each extend fully through the entire cross-section of the hat shaped body 122, up to the flanges 124. The second openings extend across the hat shaped body 122 but terminate below the flanges 124. Consequently, similar to the punch 55 previously described, the first of first openings 82 in the compactor 114 partially or fully close as the compactor 114 flexes to the desired contour during a compacting/forming operation, whereas the second openings 84 remain open, permitting the formation of small wrinkles in the composite charge 64 as it is being contoured.

Figure 18:
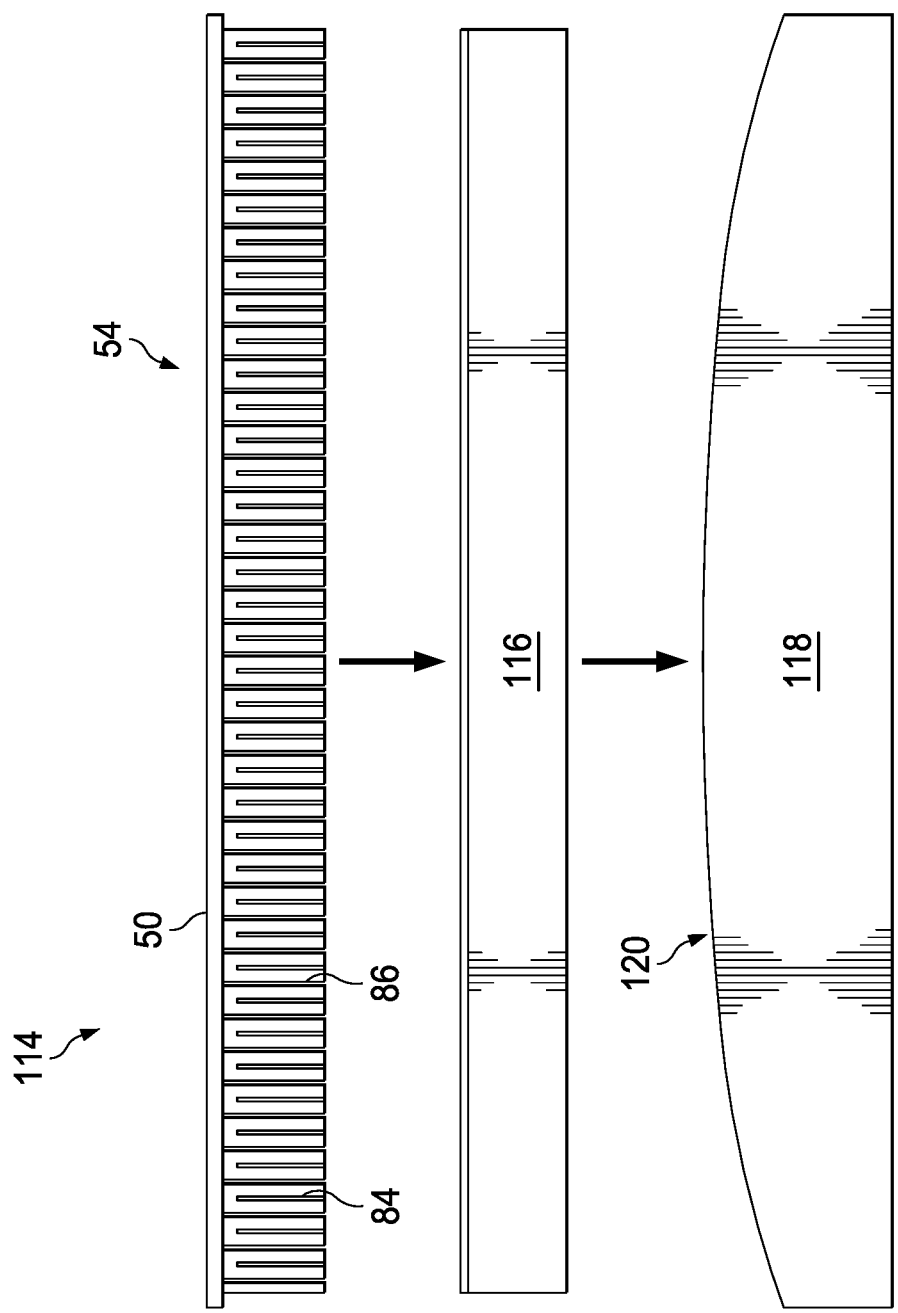
FIG. 18 is an illustration of an exploded side view showing how the compactor of FIG. 17 may be used to form a straight hat stringer to a desired contour.

Referring to FIG. 18, the compactor 114 may be used to form and/or compact a composite charge that has been formed to the desired cross-sectional shape. The compactor 114 is placed inside a straight, formed stringer 116, and the combination of the compactor 114 and formed stringer 116 are placed on a forming die 118 having a contoured die surface 120. Pressure is then applied to the compactor 114 by any suitable means such as a vacuum bag (not shown), causing the compactor 114 to form the stringer 116 down onto the contoured die surface 120. Additional pressure may be applied by the compactor 114 to compact the contoured hat stringer 116 on the forming die 118.

Figure 19:
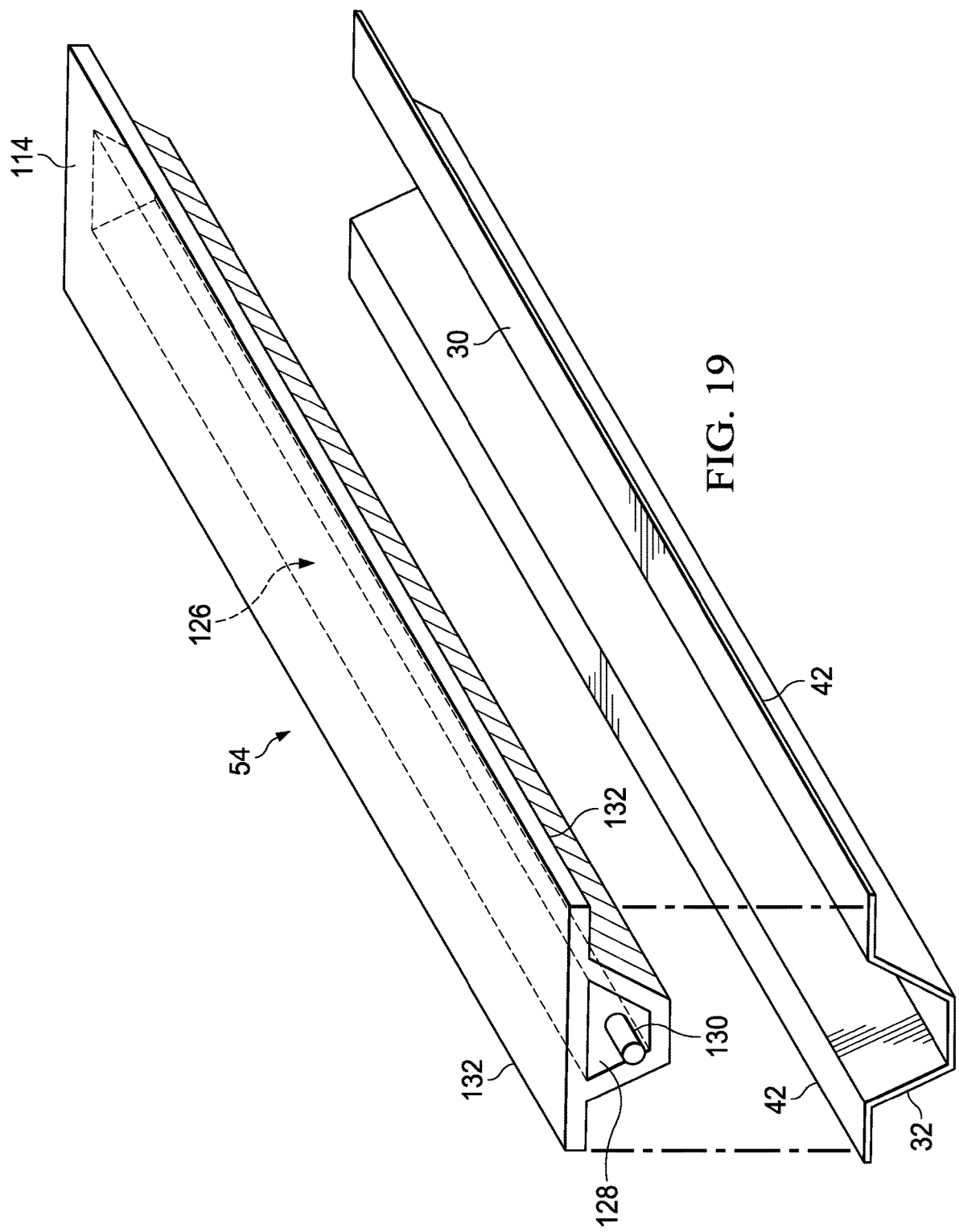
FIG. 19 is an illustration of a perspective view of another example of a compactor, positioned to pick up and transport a hat stringer.
Figure 20:
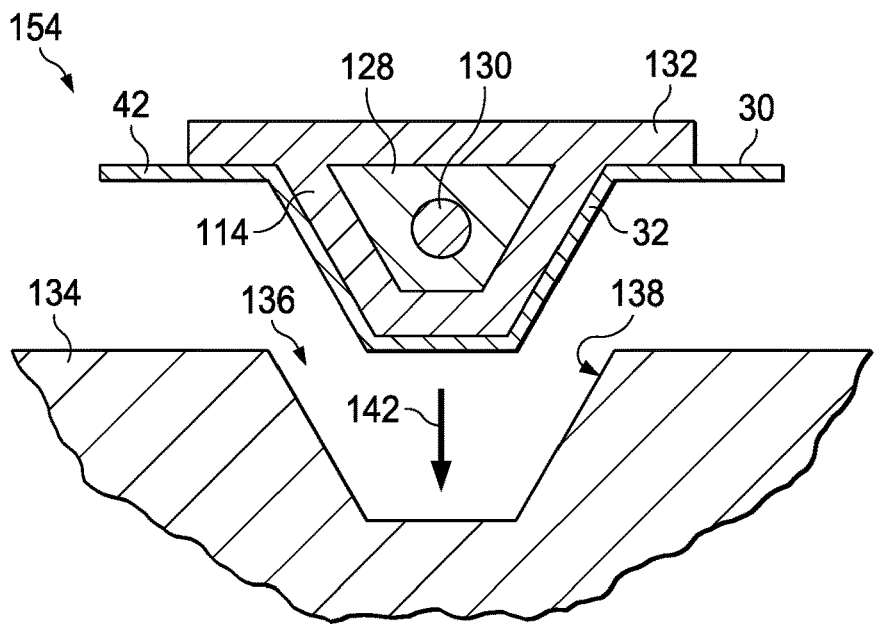
FIG. 20 is an illustration of a cross sectional view of the compactor of FIG. 19, positioned to place and form the hat stringer to contour against a forming die.

Attention is now directed to FIGS. 19 and 20 which illustrate another example of a compactor 114 that may be used to transport, contour and/or compact a hat stringer 30. In this example, the compactor 114 comprises a one-piece hat shaped body 122 and integral flanges 132 formed of a flexible material such as an elastomer. The hat shaped body 122 includes first and second openings 82, 84 therein which may comprise slits or slots arranged as previously described. The compactor 114 includes an end wall 128 provided with a tube fitting 130 that is adapted to couple the hollow interior chamber 126 with a vacuum source (not shown). A vacuum applied to the hollow interior chamber 126 results in air being drawn in through the openings 82, 84, producing a suction effect. When the compactor 114 is placed inside a straight hat stringer 30 and suction is drawn within the compactor 114, the hat stringer 30 is drawn against the compactor 114, allowing the compactor 114 to pick up and transport the hat stringer a different location, such as a forming station (not shown).

FIG. 20 shows the compactor 114 having picked up a hat stringer 30 using suction drawn through the openings 82, 84, and about to lower 142 the hat stringer 30 into a die cavity 136 in a forming die 134. The forming die 134 includes a die surface 138 that is contoured along its length. After placing the hat stringer 30 in the die cavity 136, forming pressure is applied to the compactor 114, causing the hat stringer 30 to be formed to the contour of the die cavity 136. Additional pressure applied to the compactor 114 by any suitable means such as a vacuum bag (not shown) results in compaction of the contoured hat stringer on the forming die 134.

Figure 21:
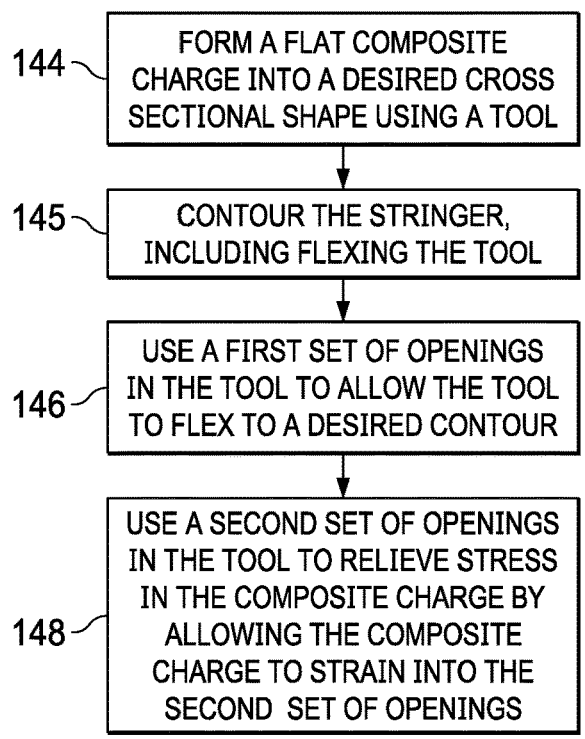
FIG. 21 is an illustration of a flow diagram of a method of making a contoured hat stringer having reduced wrinkling.

Attention is now directed to FIG. 21 which broadly illustrates the overall steps of a method of forming a contoured hat stringer 30 exhibiting reduced wrinkling. Beginning at 144, a flat composite charge 64 is formed to a desired cross-sectional shape using a tool 54, such as a punch 55. At 145, the hat stringer 30 is contoured, including flexing the tool. At 146, a set of first openings 82 in the tool 54 is used to allow the tool 54 to flex to a desired contour. At 148, a set of second openings 84 in the tool 54 is used to relieve stress in the composite charge 64 by allowing the composite charge 64 to strain into the second openings 84.

Figure 22:
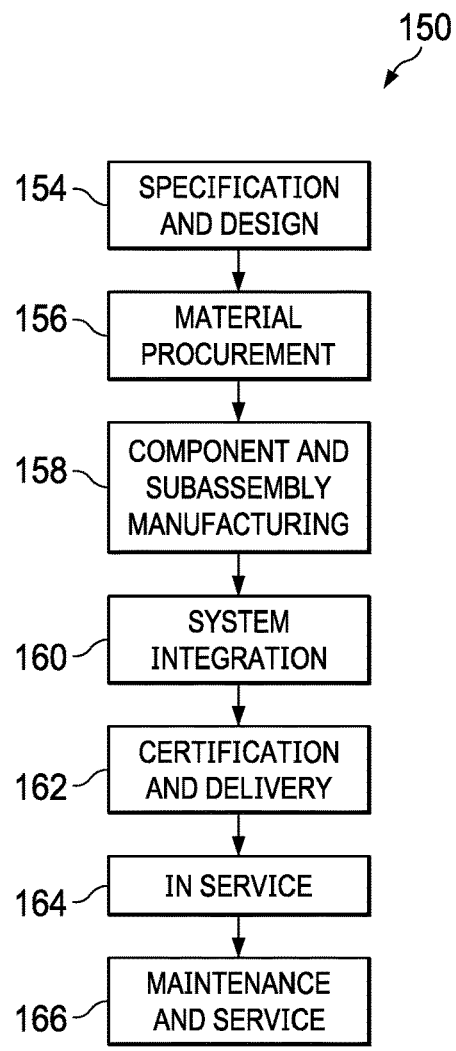
FIG. 22 is an illustration of a flow diagram of aircraft production and service methodology.
Figure 23:
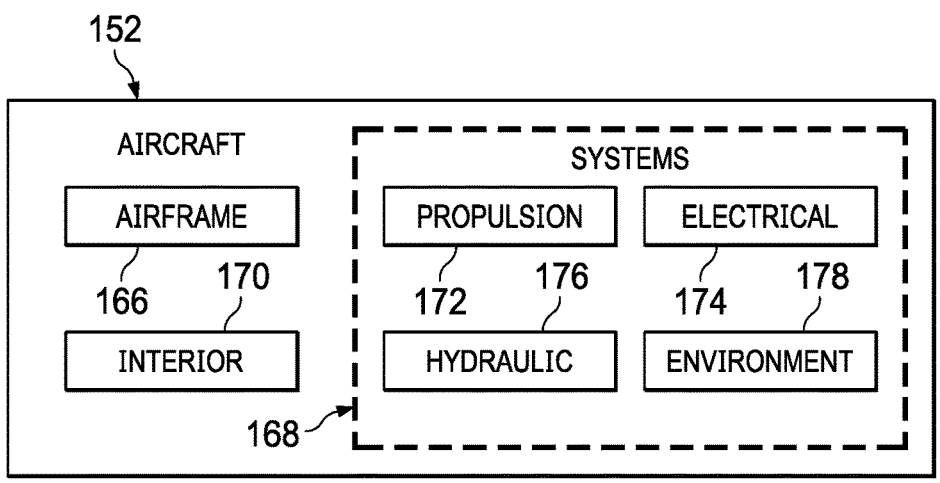
FIG. 23 is an illustration of a block diagram of an aircraft.

Examples of the disclosure may find use in a variety of potential applications, particularly in the transportation industry, including for example, aerospace, marine, automotive applications and other application where contoured stiffeners, such as contoured hat stringers in aircraft, may be used. Thus, referring now to FIGS. 22 and 23, examples of the disclosure may be used in the context of an aircraft manufacturing and service method 150 as shown in FIG. 22 and an aircraft 152 as shown in FIG. 23. Aircraft applications of the disclosed examples may include a variety of composite stiffeners such as stringers that have contours, curvatures, varying thicknesses or other non-uniformities along their lengths. During pre-production, exemplary method 150 may include specification and design 154 of the aircraft 152 and material procurement 156. During production, component and subassembly manufacturing 158 and system integration 160 of the aircraft takes place. Thereafter, the aircraft 152 may go through certification and delivery 162 in order to be placed in service 164. While in service by a customer, the aircraft 152 is scheduled for routine maintenance and service 166, which may also include modification, reconfiguration, refurbishment, and so on.

Each of the processes of method 150 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 23, the aircraft 152 produced by exemplary method 150 may include an airframe 166 with a plurality of systems 168 and an interior 170. Examples of high-level systems 168 include one or more of a propulsion system 172, an electrical system 174, a hydraulic system 176 and an environmental system 178. Any number of other systems may be included. Although an aerospace example is shown, the principles of the disclosure may be applied to other industries, such as the marine and automotive industries.

Systems and methods embodied herein may be employed during any one or more of the stages of the aircraft manufacturing and service method 150. For example, components or subassemblies corresponding to production process 158 may be fabricated or manufactured in a manner similar to components or subassemblies produced while the aircraft 150 in service 164. Also, one or more apparatus examples, method examples, or a combination thereof may be utilized during the production processes 158 and 160, for example, by substantially expediting assembly of or reducing the cost of an aircraft 152. Similarly, one or more of apparatus examples, method examples, or a combination thereof may be utilized while the aircraft 152 is in service, for example and without limitation, to maintenance and service 166.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different advantages as compared to other illustrative examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A tool for forming a composite charge into a contoured composite stringer, comprising:
a tool body, the tool body being flexible and having a length,
the tool body having a set of transversely extending first openings therein configured to allow the tool body to flex during forming of the composite charge, each of the set of transversely extending first openings having a height extending through an entire height of the tool body,
the tool body having a set of transversely extending second openings therein into which portions of the composite charge may strain during the forming,
each of the set of transversely extending second openings having a height less than the entire height of the tool body and configured to remain at least partially open during forming of the contoured composite stringer, wherein there is a section in the tool body immediately above each of the set of transversely extending second openings that prevents each of the set of transversely extending second openings from closing completely during the forming.

2. The tool of claim 1, wherein:
each of the set of transversely extending first openings are configured to at least partially close during forming of the composite charge, and
each of the set of transversely extending second openings are configured to remain substantially open during forming of the composite charge.

3. The tool of claim 1, wherein the tool body has a cross-sectional shape substantially matching a cross-sectional shape of the composite stringer.

4. The tool of claim 1, wherein each of the set of transversely extending first openings and each of the set of transversely extending second openings are alternately arranged along the length of the tool body.

5. The tool of claim 1, wherein the tool body is a compactor configured to compact the composite charge against a contoured die surface.

6. The tool of claim 1, wherein:
the tool body is a punch configured to form the composite charge into a die cavity, and
each of the set of transversely extending first opening and each of the set of transversely extending second openings is a slot in the punch.

7. The tool of claim 1, wherein each of the set of transversely extending second openings has a width configured to allow formation therein of a wrinkle in the composite charge during the forming.

8. The tool of claim 1, wherein the set of transversely extending first openings comprise slots.

9. The tool of claim 1, wherein the set of transversely extending first openings comprise slits.

10. The tool of claim 1, wherein the set of transversely extending second openings comprise slots.

11. The tool of claim 1, wherein the set of transversely extending second openings comprise slits.

12. A tool for forming a composite charge into a contoured stringer having a desired cross sectional shape, comprising:
a punch configured to form the composite charge into a formed stringer having the desired cross sectional shape, and to contour the formed stringer along a length of the formed stringer,
the punch having a first plurality of openings therein, each of the plurality of first openings having a height extending through an entire height of the punch,
the punch having a second plurality of openings therein into which the composite charge may strain as the formed stringer is being contoured along its length, and
wherein each of the second plurality of openings having a height less than an entire height of the punch and configured to remain at least partially open during forming the composite charge into the contoured stringer, wherein there is a solid section in the punch immediately above each of the openings that prevents each of the openings from closing completely during the forming.

13. The tool of claim 12, wherein the punch is formed of a flexible material.

14. The tool of claim 12, wherein:
the punch is flexible along a length of the punch and is configured to flex as the formed stringer is being contoured, and
the second plurality of openings include slots in the punch extending transversely through the punch, each of the slots being configured to remain open as the formed stringer is being contoured.

15. The tool of claim 14, wherein the first plurality of openings are configured to provide the punch with flexibility and at least partially close when the formed stringer is being contoured.

16. The tool of claim 13, wherein each of the second plurality of openings into which the composite charge may strain and each of the first plurality of openings providing the punch with flexibility are arranged in alternating relationship to each other along the length of the punch.

17. The tool of claim 12, wherein the first plurality of openings comprise slots.

18. The tool of claim 12, wherein the first plurality of openings comprise slits.

19. The tool of claim 12, wherein the second plurality of openings comprise slots.

20. The tool of claim 12, wherein the second plurality of openings comprise slits.

21. A tool for forming a composite charge into a contoured composite stringer, comprising:
a flexible top plate; and
a tool body connected to the flexible top plate,
the tool body having a plurality of openings extending through an entire height of the tool body, the plurality of openings configured to provide the tool body with flexibility during forming of the contoured composite stringer from the composite charge, and
the tool body having a plurality of grooves extending through less than the entire height of the tool body, the plurality of grooves configured to remain at least partially open during forming of the contoured composite stringer, wherein there is a solid section in the tool body immediately above each of the plurality of grooves that prevents each of the grooves from closing completely during the forming.

22. The tool of claim 21, wherein each of the plurality of openings and each of the plurality of grooves are arranged in alternating relationship to each other.

23. The tool of claim 21, further comprising a pair of dies coupled to the tool, the pair of dies spaced apart to form a die cavity.

24. The tool of claim 21, wherein the plurality of openings comprise slots.

25. The tool of claim 21, wherein the plurality of openings comprise slits.

* * * * *